No. 885,982. PATENTED APR. 28, 1908.
R. J. A. DELACROIX.
DRIVING GEAR FOR VELOCIPEDES.
APPLICATION FILED AUG. 4, 1906.
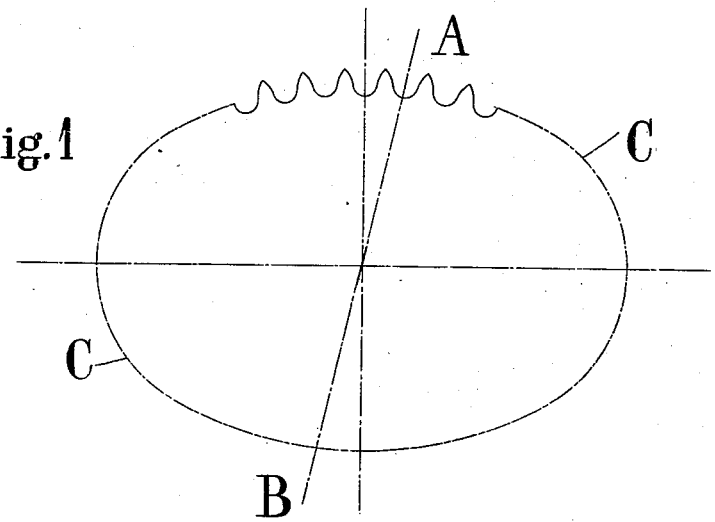
Fig. 1
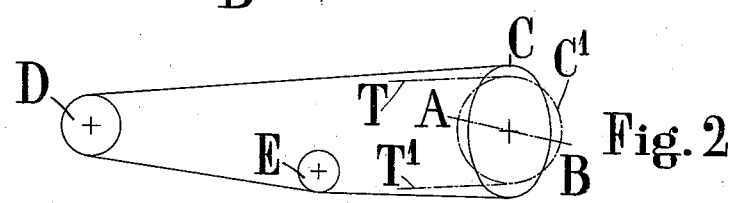
Fig. 2
Fig. 3
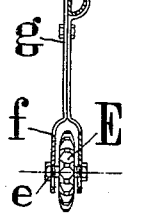
Fig. 5
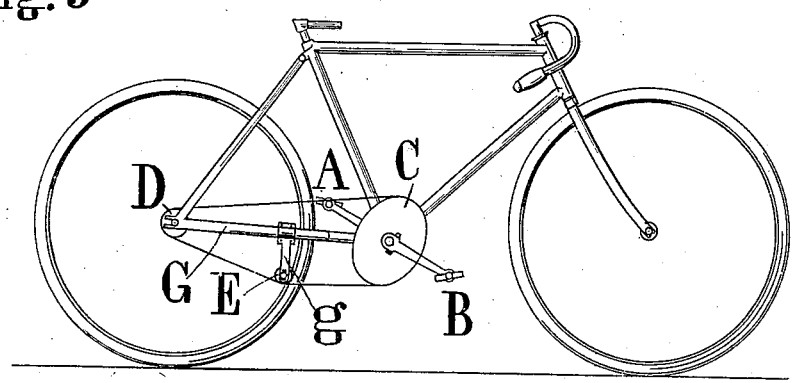
Fig. 4
WITNESSES
INVENTOR
René Jules Alphonse Delacroix,

UNITED STATES PATENT OFFICE.

RENÉ JULES ALPHONSE DELACROIX, OF BESANÇON, FRANCE.

DRIVING-GEAR FOR VELOCIPEDES.

No. 885,982.  Specification of Letters Patent.  Patented April 28, 1908.

Application filed August 4, 1906. Serial No. 329,186.

*To all whom it may concern:*

Be it known that I, RENÉ JULES ALPHONSE DELACROIX, a citizen of the French Republic, and residing at 15 Avenue Carnot, Besançon, Doubs, in the Republic of France, captain in the personal staff of the engineers, have invented a certain new and useful Improvement in Driving-Gear for Velocipedes, of which the following is a full, clear, and exact description, and for which I have applied for Letters Patent in France, dated August 19, 1905.

This invention has reference to driving gear for cycles and the like, of the kind in which a chain is driven by means of an oval, elliptical or similar wheel mounted on the pedaling crank axle with the object of improving the conditions in which power is applied to the wheel by varying the effective throw and leverage exerted by the rider.

According to the present invention, the chain wheel is operated by pedal cranks which lie slightly in advance of the minor axis of the wheel, which arrangement tends to insure even pedaling and a constant tension of the chain and to avoid a jerky action, while the slack side of the chain is tensioned by a jockey pinion. This jockey wheel is revoluble on a fixed axis or spindle, mounted upon the frame in a position such that no appreciable variation of the chain tension on the slack side occurs during the revolution of the driving chainwheel. This is effected by placing the axis of the jockey pinion or pulley upon the frame in a certain line so that the common tangent to the jockey pinion and to a circle concentric with the chainwheel having as diameter the mean of the axis of the chainwheel must be parallel to the common tangent to this same circle and the sprocket of the driving roadwheel.

Upon the accompanying drawings, I have illustrated my invention, Figure 1 being a diagram of the oval or elliptical chainwheel. Figs. 2 and 3 represent diagrammatically the conditions of driving in the two extreme positions of the chainwheel. Fig. 4 shows the application of the invention to a velocipede of ordinary construction. Fig. 5 is an edge view of the jockey pinion and its support, the chain stay G being shown in section.

The pedal cranks are represented by the line A B, lying at about 10° or 12° angle in advance of the axis perpendicular to the major axis of the oval chainwheel C. This latter may have any desired shape, such as oval, elliptical, cycloidal or the like. The sprocket of the driving roadwheel is shown at D, and E is the jockey pinion mounted upon a fixed axis. The position of this axis is such that when the major axis of the chainwheel is vertical, *i. e.*, when the pedals are in a position to exert the greatest driving power (Fig. 2), the portion of the chain extending from the wheel or pinion E to the bottom of the chainwheel C is substantially horizontal, and its length is consequently at a minimum. At the same time the upper or driving side of the chain, extending from the sprocket D to the top of the wheel C has its greatest inclination and is therefore at a maximum length.

In Fig. 2 I have shown in dotted lines a circle C' described with a radius which is the mean of the two semi-axes of the elliptical wheel. The tangents T and T' to this circle from respectively the rear sprocket and the jockey pinion are parallel in accordance with this invention.

When the major axis of the chain wheel becomes horizontal, Fig. 3, the length of chain comprised between pinion or pulley E and the chain wheel C is approaching its greatest inclination and consequently its maximum length; the precise instant when these become maxima will depend to some extent upon the distance between the pulley and the chain wheel and the particular curve assigned to the latter. At this time the upper portion of the chain has its least inclination and is therefore of minimum length. It will be seen that when either of these portions of chain of which the length varies, is at a maximum, the other is at a minimum and vice versa. These two variations will mutually counteract one another and cause no difference in the chain tension. Now the remaining portions of the chain do not appreciably vary in length; they consist of a length equal to half the circumference of the sprocket, a portion of chain extending from this to the jockey pulley or pinion, and a length equal to half the circumference of the chain wheel. The tension of the chain on the slack side will therefore be automatically compensated by the jockey pinion or pulley E revoluble on the fixed axis.

In Figs. 4 and 5 I have shown the jockey pulley or pinion E mounted on an axle *e* journaled in a fork or bracket *f* which is formed with or secured in any convenient manner to, an arm or support *g* fastened by means of an ordinary clip to the chain stay G of the machine. The axle *e* may be secured in slots in the fork *f* to permit of a fine adjustment of the position of the jockey pinion E and the axle is clamped in the desired position in the said slots by means of nuts screwed upon the screw threaded extremities of the axle *e*.

Having thus described my invention, what I claim as such and desire to secure by Letters Patent, is:—

1. In a transmission gear for velocipedes, the combination of a chain wheel, said chain wheel having a major axis and a minor axis, pedal cranks for operating said chain wheel, said pedal cranks lying at an inclination to the major axis and slightly in advance of the minor axis of said chain wheel, a chain, a small chain wheel mounted on the hub of the driving wheel, and of a jockey pinion revoluble on a fixed axis upon the frame and serving to regulate automatically the tension of the chain and situated so that tangents from the small chain wheel and the jockey pinion respectively to a circle concentric with the chain wheel having as diameter the mean of the axes of the same, will be parallel.

2. In a driving gear for velocipedes, the combination of a chain wheel, said chain wheel having a major axis and a minor axis, pedal cranks for operating said chain wheel, said pedal cranks lying at an inclination to the major axis, and at about 10° or 12° in advance of the axis perpendicular to said major axis, so as to be slightly in advance of the minor axis of said chain wheel, a chain, a chain sprocket secured to the road wheel, a jockey wheel revoluble on a fixed axis, said fixed axis being carried by a forked bracket secured to the chain-stay and so situated that tangents from the small chain wheel and the jockey pinion respectively to a circle concentric with the chain wheel having as diameter the mean of the axes of the same, will be parallel.

In testimony whereof I affix my signature in presence of two witnesses.

RENÉ JULES ALPHONSE DELACROIX.

Witnesses:
P. JABEAU,
P. JAWLOT.